United States Patent [19]
Rosow et al.

[11] Patent Number: 6,017,268
[45] Date of Patent: Jan. 25, 2000

[54] SHRIMP PEELING APPARATUS ROLLER HOLD DOWN ASSEMBLY

[75] Inventors: Ben Rosow, New Orleans; Brent A. Ledet; Joseph F. Scamardo, Jr., both of Metairie; Scott J. Sirgo, Covington, all of La.

[73] Assignee: The Laitram Corporation, New Orleans, La.

[21] Appl. No.: 09/145,693

[22] Filed: Sep. 2, 1998

[51] Int. Cl.[7] .................................................. A22C 29/00
[52] U.S. Cl. ....................................... 452/5; 452/9
[58] Field of Search .................................. 452/5, 1, 2, 9

[56] References Cited

U.S. PATENT DOCUMENTS

| | | |
|---|---|---|
| 2,429,828 | 10/1947 | Lapeyre et al. . |
| 2,537,355 | 1/1951 | Lapeyre et al. . |
| 2,574,044 | 11/1951 | Lapeyre et al. . |
| 2,637,065 | 5/1953 | Lapeyre et al. . |
| 2,778,055 | 1/1957 | Lapeyre et al. . |
| 3,070,832 | 1/1963 | Lapeyre . |
| 3,383,734 | 5/1968 | Lapeyre . |
| 3,626,551 | 12/1971 | Lapeyre . |
| 3,706,113 | 12/1972 | Lapeyre et al. . |
| 3,740,795 | 6/1973 | Cox . |
| 3,816,877 | 6/1974 | Bullock . |
| 3,971,102 | 7/1976 | Skrmetta . |
| 3,975,797 | 8/1976 | Grimes et al. . |
| 4,400,849 | 8/1983 | Dell . |
| 5,005,258 | 4/1991 | Griffis . |
| 5,108,342 | 4/1992 | Lapeyre et al. . |
| 5,120,265 | 6/1992 | Ledet et al. . |
| 5,346,424 | 9/1994 | Chiu et al. . |

*Primary Examiner*—Willis Little
*Attorney, Agent, or Firm*—Garvey, Smith, Nehrbass & Doody, LLC

[57] ABSTRACT

A shrimp peeling apparatus includes a support frame upon which are mounted a plurality of larger diameter rollers and a plurality of smaller diameter insert rollers. Each smaller diameter insert roller is supported by two adjacent larger diameter rollers and is held in contact to the adjacent larger diameter rollers with a hold down assembly. The assembly includes a tension member and an adjustment for varying the load transfer between a selected smaller diameter insert roller and the pair of larger diameter rollers.

45 Claims, 8 Drawing Sheets

SHRIMP PEELING APPARATUS ROLLER HOLD DOWN ASSEMBLY

BACKGROUND OF THE INVENTION

1. Field of the Invention

The present invention relates to shrimp peeling devices, and more particularly to a method and apparatus for peeling shrimp that includes alternating larger diameter rollers and smaller diameter insert rollers positioned side-by-side and wherein an improved roller hold down device loads the smaller diameter insert rollers into contact with the larger diameter rollers with an improved configuration and geometry that enhances efficiency, minimizes shrimp damaged during peeling, and affords flexibility when shrimp vary in grade and type.

2. General Background of the Invention

In about 1947, Fernand S. Lapeyre and James M. Lapeyre were faced with the problem of peeling shrimp with a mechanized peeler. The shrimp peeler that they invented made it no longer necessary to rely upon hand labor to sort, peel, or clean shrimp. Early patents that relate to these Lapeyre shrimp peelers include U.S. Pat. Nos. 2,637,065; 2,537,355; 2,574,044; and 2,429,828.

An example of these early patents is the Lapeyre Patent 2,537,355 entitled "Machine For Peeling Shrimp". The '355 patent discloses a machine for peeling shrimp that includes a channel through which the shrimp are adapted to move comprising a base roller and two spaced channel rollers above and in contact with opposite side portions of the base roller to provide a nip running longitudinally at each side of the channel. Means are provided on the machine to impart an oscillatory motion to the base roller to move the shrimp in the channel from one side nip to the other.

The Lapeyre Patent 2,778,055 discloses a machine for peeling shrimp that includes a bottom roller on the machine, parallel side rollers on the machine disposed on opposite sides of the bottom roller and spaced therefrom, and elevated therefrom to form a peeling channel with the bottom roller for the shrimp. Insert rollers are operatively associated with the machine and positioned between the bottom and side rollers. A hold down arrangement is provided for the insert rollers that is operatively associated with the bottom and side rollers exending movably down through the spaces between the bottoma nd side rollers having a resilient connection to the machine. The '055 patent names Fernand Lapeyre, James Lapeyre, and Emile Lapeyre as inventors.

U.S. Pat. No. 3,070,832, entitled "Pressure Finger Loading Device For A Shrimp Peeling Machine", names Fernand S. Lapeyre as inventor. The '832 patent relates to a pressure finger loading device for a shrimp peeling machine and has for an object to provide means for loading differentially or equally and simultaneously all of the pressure fingers carried in a pressure-finger frame such as the pressure finger frame illustrated in U.S. Pat. No. 2,778,055.

An apparatus for peeling pre-cooked shrimp is the subject of U.S. Pat. No. 3,383,734, issued for James M. Lapeyre. The '734 patent includes a first peeling section having members forming peeling nips positioned to receive shrimp hot from a cooker. The first peeling section has pressure means for urging the shrimp into contact with said members forming said peeling nips. A second peeling section is positioned to receive shrimp from the discharge end of the first peeling section. The second peeling section has peeling nips defined by members having different coefficients of friction between themselves and the second peeling section being devoid of any pressure means for urging the shrimp into contact with the members forming the peeling nips. The second peeling section is up to one-half the length the first peeling section.

A drive mechanism for a shrimp peeling machine is disclosed in U.S. Pat. No. 3,626,551, issued to James M. Lapeyre. The '551 patent is directed to driving the peeling rollers of a shrimp peeling machine and the pressure finger frames mounted thereover by a pitman arm actuated bell crank, which rocks on a cam shaft or a pair of cam shafts which raises and lowers the pressure finger frame and simultaneously drives the peeling rollers.

U.S. Pat. No. 3,706,113 provides a shrimp peeling machine that is directed to hold down devices for insert rolls on shrimp peeling machines and embodies an upright member subject to being spring loaded at its base and carrying a cross beam member proximate its top which is retained in a loose fit by a plastic filler material which will permit the cross beam to rock relative to an upright member. Each end of the cross beam member is hooked downwardly to pass through and restrain insert roll hold down straps.

U.S. Pat. No. 3,740,795, issued to James Cox and entitled "Seafood Peeler Using Rollers Of An Endless Conveyor And A Bank Of Inclined Rollers" discloses a machine that peels seafood such as shrimp. The seafood is delivered to rollers. When the contacting surface between the rollers moves downward, they draw the shell through the reject the slippery meat. On the reverse movement of the surfaces, the rejected meat is carried over the second roller to the next.

U.S. Pat. No. 3,816,877, issued to Kenneth Bullock, discloses a shrimp cleaning machine. The '877 patent is directed to cleaning marine life such as shrimp by passing the shrimp down between spaced peeling rolls and having a vertically reciprocating plate therebetween with the rolls on movable centers positioned as a function of the plate shape and position, with the plate having shaped sides with a traveling belt moving over the top edge of the plate for carrying away the cleaned shrimp. The rolls have an outer surface of a predetermined hardness and material rotating at a predetermined speed with the plate vertically reciprocating at a predetermined speed and a spray provided for cleaning the rolls and plate and forcing uncleaned shrimp into the nips between the rolls and plate.

U.S. Pat. No. 3,971,102, issued to Skrmetta, discloses a roller for shrimp peeling machines that include a gapped portion along its length, for example at its upper end, to effectively shorten the effective peeling section of the machine without substantial modification of the basic machine itself by allowing the shrimp to fall through the gapped portion rather than traversing the full length of the roller. The gapped rollers are substituted for the standard peeling rollers which provide peeling action along their full length, when a shorter peeling section is desired. Several different gapped rollers are disclosed, some reversible end-for-end and others forming a series of subsequently related rollers which have a varying location of the gap portion along the roller length.

U.S. Pat. No. 3,975,797, issued to Grames et al., is directed to a shrimp processing apparatus. In the '797 patent, cooked shrimp to be peeled are distributed successively to tiers of sets of peeler rolls and cooperative reciprocative bars. The apparatus is said to permit coordinated adjustments of nip spacing and taper angle in the roll-bar tiers independently at corresponding ends of the sets and in each tier independently of the other to permit optimum shucking in the first tier and polishing in the second tier suited to type and condition of shrimp. Cams are engaged by cam follower rollers connected to the peeler rolls to control nip distance between the bar and rolls at both ends as a function of relative vertical positioning of each bar and its associated peeler rolls.

The Dell Patent 4,400,849 discloses a shrimp peeling unit that features a pair of journaled generally horizontal and parallel side-by-side rollers including at least closely adjacent sides defining an elongated upwardly opening "nip" area therebetween. Structure is provided for supplying successive shrimp to be peeled to one end of the "nip" area and drive structure is operatively connected to the rollers for inversely oscillating the latter. The drive structure includes adjustment features operative to adjust the angular extent of oscillation of the rollers, the phase change speed of oscillation of the rollers and the cycle frequency of oscillation of the rollers. Further, a row of fingers are mounted for adjustable speed movement along the "nip" area and are engageable with the shrimp within the "nip" area for urging the shrimp therealong and spray heads are arranged along the "nip" area for directing spray jets of liquid into the "nip" area for assisting in the removal of the shells of the shrimp and also the cleaning of the shrimp being peeled or shelled.

In the Griffis Patent 5,005,258, a plurality of shucked shellfish are mechanically eviscerated utilizing a series of longitudinally aligned inclined channels, each channel formed of a power-driven roller and adjacent insert rollers. The insert rollers extend generally parallel and longitudinally and are aligned with each other. The frictional surfaces of the rollers and the spacing between the adjacent rollers, or both, are controlled to effectively separate the soft shellfish viscera from the soft adductor muscle of the shellfish without significant damage to the muscles.

U.S. Pat. No. 5,108,342, issued to George Lapeyre, Brent Ledet, and James E. Saul, Jr., is entitled "High Yield Peeling Means And Method for Uncooked Warm-Water Shrimp". The '342 patent discloses improved machinery and methods for peeling raw, warm-water shrimp to solve the prior art problems of scarring of the shrimp meat and removing of an excess of the edible meat. A critical nip angle of between about 21° and 33° is produced by an insert nip-forming roller having a smaller diameter than conventionally used in the prior art, to considerably improve shrimp appearance while increasing the yield of shrimp meat. Attention is also given to the length and surface configuration of the insert rollers. With at least three axially aligned insert sections, better roller support prevents bowing and lengthens life. Selection of different axially disposed surface configurations permits special-purpose treatment of shrimp. For example, initial removal of waste is expedited by knurled surface sections, and final treatment by smoother sections prevents disfiguration of the peeled shrimp meat.

In the Ledet Patent 5,120,265, there is disclosed an apparatus and method for improving the yield of peeled shrimp meat obtained with roller-type peeling machinery. In the '265 patent, the yield increase is achieved by means of critical interacting operating relationships in the peeling action between power rollers, intermediate rollers, and insert rollers, expressed in terms of relative roller diameters. Preferred sets of rollers are identified that significantly increase the yields of cold water Pandalus species of shrimp in sizes of 90/kg to 350/kg over conventional commercial rollers. The high throughput quantity of the peelers is not seriously compromised and may be even increased by the ability to provide more peeling channels in a conventional size peeling tray by replacement with smaller diameter power rollers. The preferred roller sets for use in current standard commercial equipment, without other changes, has lower power rollers of 2.5 inch (6.4 cm) diameter, intermediate upper channel forming rollers of 2 inch (5 cm) diameter and insert rollers of 7/16 inch (1.1 cm) diameter. The method of establishing critical roller diameters provided by this invention permits adaption of the feature of obtaining highest yields feasible with critical roller diameter selections for various conditions encountered in the shrimp peeling industry or at a particular peeling site, including product variations from different shrimp catches, sizes, species, etc.

U.S. Pat. No. 5,346,424, issued to Chiu et al., discloses an automatic size-grading and shrimp peeling machine for shrimp. The automatic grading machine includes a plate-partition conveyor mounted to a slanting platform. The slanting platform is mounted with at least three conveying screw shafts coupled with the plate-partition conveyor and a plurality of feeding pipes of peeling machine. The automatic grading machine is mounted on a machine supporting frame so as to have all feeding ports mounted over the peeling machine, which includes at least three peeling units. Each unit includes a large swing peeling roller and two small revolving peeling rollers; a pressing roller and at least one squeezing wheel are mounted between two small revolving peeling rollers. The squeezing wheel and the pressing roller are mounted parallel to each other, but perpendicular to the small revolving peeling rollers.

BRIEF SUMMARY OF THE INVENTION

The present invention provides an improved shrimp peeling apparatus that includes a support frame carrying a plurality of larger diameter rollers and a plurality of smaller diameter insert rollers. Each smaller diameter insert roller is supported by a pair of adjacent larger diameter rollers.

The diameter of each of the plurality of larger diameter rollers is much greater than the diameter of each of the plurality of smaller diameter insert rollers. A hold down assembly is provided for holding each of the smaller diameter insert rollers in close engagement with a pair of adjacent larger diameter rollers.

The hold down assembly includes, at an upper portion, a hold down member to retain the smaller diameter insert roller in rotational contact with the pair of adjacent larger diameter rollers. A tension member applies tension to the hold down member to pull the insert roller into close engagement with the pair of adjacent larger diameter rollers. An adjustment is provided for varying the load transfer between a selected smaller diameter insert roller and the adjacent larger diameter rollers by varying the load carried by the tension member.

The hold down assembly can include a plate having adjustment positions (e.g., openings) spaced over the plate. In such a situation, the tension member is a tensile member having end portions with hooks that enable the tensile member to be attached to the frame and extend to the openings of the plates, being removably attached thereto using hook end portions. The tensile member can be an adjustable-length elastic member that stretches in order to apply tension. Tension adjustment is easy with this version of the hold down assembly.

The hold down assembly can alternatively be in the form of an elongated vertical shaft attached at one end to the hold down member. The rod shaft extends through a transverse barrel having hold down rollers thereon. For applying tension to the vertical shaft, an adjustment nut and cylindrically-shaped resilient sleeve can be provided at the other end of the shaft. By tightening the nut, the sleeve compresses against the transverse barrel so that a load is formed in between the smaller diameter insert roller and the larger diameter rollers. A load is also formed between the hold down rollers and the larger diameter rollers.

In the alternate embodiment, the hold down rollers are positioned underneath the larger diameter rollers and generally opposite the smaller diameter insert rollers. This version of the hold down assembly need not be attached directly to the frame, which avoids many of the problems, such as chafing of the rollers by the hold down members caused by imprecise alignment of the frame with the larger diameter rollers. This free-floating hold down assembly is inherently self-positioning.

DETAILED DESCRIPTION OF THE INVENTION

Figure 1:
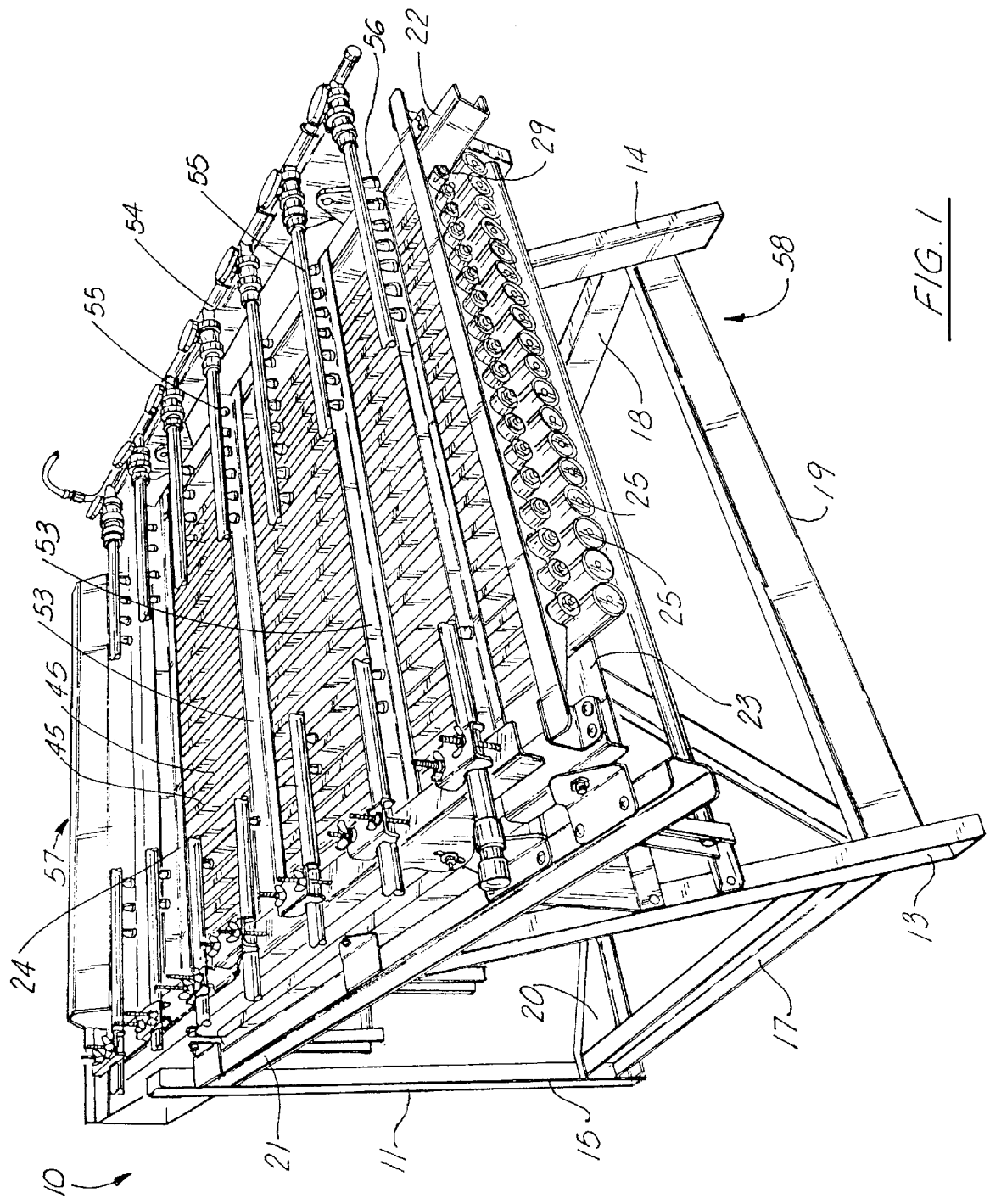
FIG. 1 is a perspective view of the preferred embodiment of the apparatus of the present invention.
Figure 2:
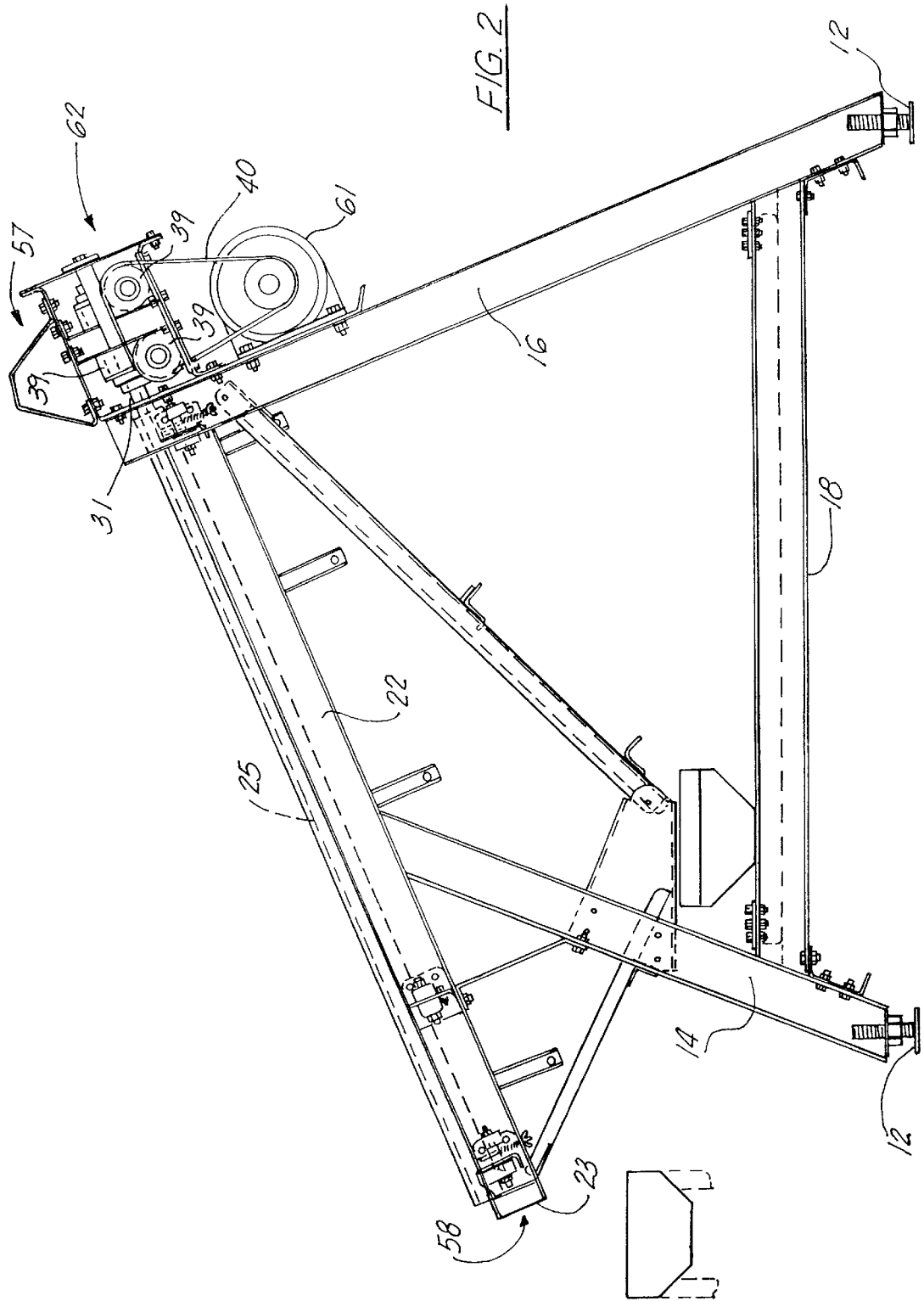
FIG. 2 is a side elevational view of the preferred embodiment of the apparatus of the present invention.

FIGS. 1–2 show generally the preferred embodiment of the apparatus of the present invention designated generally by the numeral 10. Shrimp peeler apparatus 10 includes a frame 11 having a plurality of supporting feet 12 attached to diagonally extending supporting legs 13, 14, 15, 16. Horizontal beams 17, 18 extend respectively between the front legs 13, 14 and the rear legs 15, 16. Horizontal beam 19 extends between front legs 13 and 14, horizontal beam 20 extends between rear legs 15, 16.

Frame 11 includes an upper frame portion for holding a plurality of rollers 25, 26 in generally parallel relationship. Frame 11 can thus have upper inclined beam sections 21, 22 and transverse plate sections 23, 24 that are spaced across the upper portion of frame 11, connecting between beams 21 and 22. Frame 11 supports a plurality of rollers including larger diameter rollers 25 and smaller diameter insert rollers 26.

Figure 8:
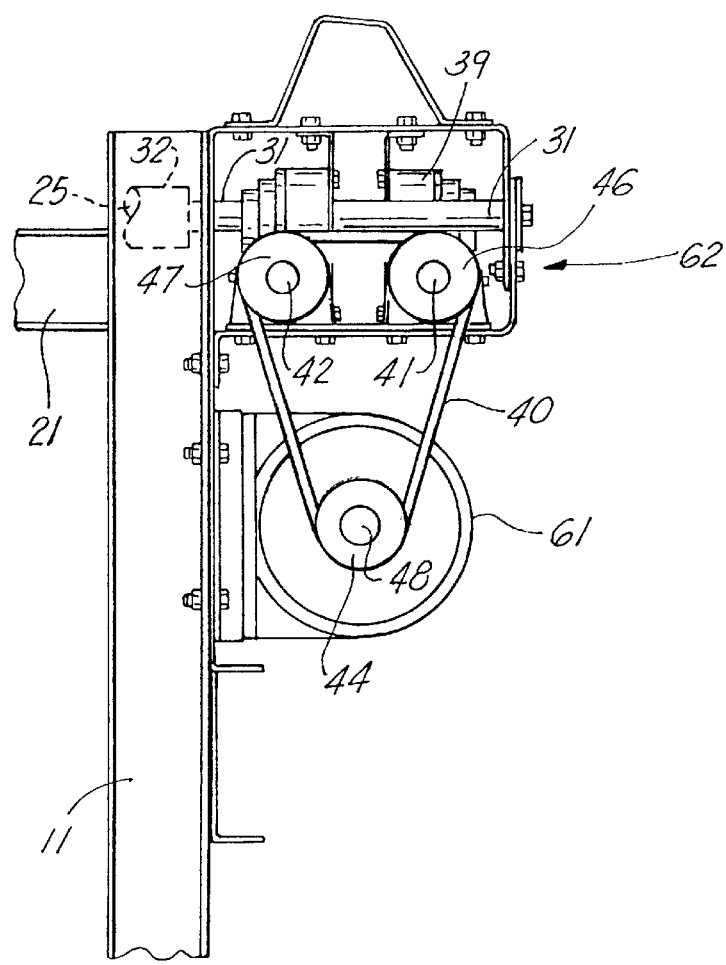
FIG. 8 is a transverse elevational view of the preferred embodiment of the apparatus of the present invention illustrating the motor drive and transmission portion thereof.

Each larger diameter roller 25 has a larger diameter section 32 along most of its length and at one end (as shown in FIG. 8) and a smaller diameter section 31, or shaft, extending into a drive such as a gear box 39 at the upper or input end 57 of the peeler.

Figure 7:
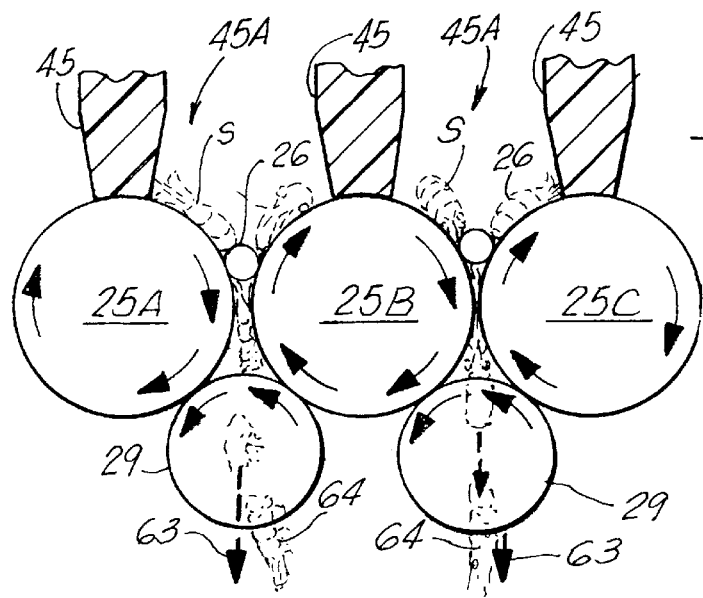
FIG. 7 is a schematic fragmentary elevational view of the preferred embodiment of the apparatus of the present invention.

A motor 61 drives the larger diameter rollers 25 through a drive train 62 including pulleys, a belt 40, and the gear boxes 39. This drive train 62 is attached to the frame 11. The larger diameter rollers 25 are thus supported at the upper input end 57 of the peeler 10 at the gear boxes 39. Idler rollers 79 near the output end 58 of the peeler position and support the larger diameter rollers 25 from below. The idler rollers 79 (shown in more detail in FIGS. 7 and 9) are rotatably attached to the frame 11 across the width of the peeler 10.

Each pair of idler rollers 79 supports two adjacent larger diameter rollers 25. The idler rollers 79 are mounted on a rod 81 threaded at one end for fastening hardware such as nut 82 and washers 84. The smaller insert rollers 26, typically stainless steel, are held in position with hold down roller assemblies 27. Hold down roller assemblies 27 engage the bottom of two adjacent larger diameter rollers 25, typically having a rubber or polymeric surface 37, as shown in FIGS. 3–5 and 7. Dividers 45 define channels 45 A therebetween for holding shrimp S to be peeled.

Figure 3:
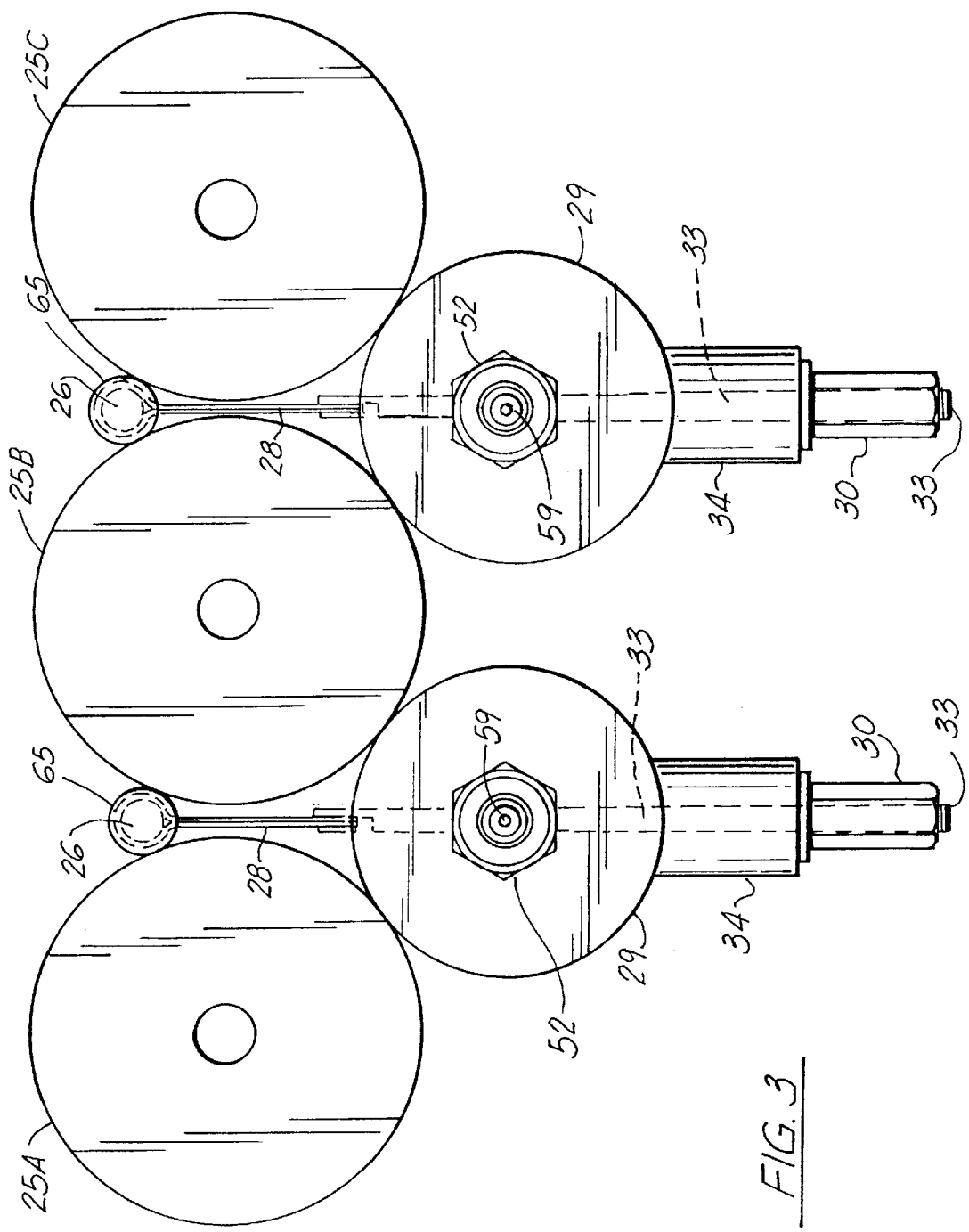
FIG. 3 is a partial elevational view of the preferred embodiment of the apparatus of the present invention.
Figure 4:
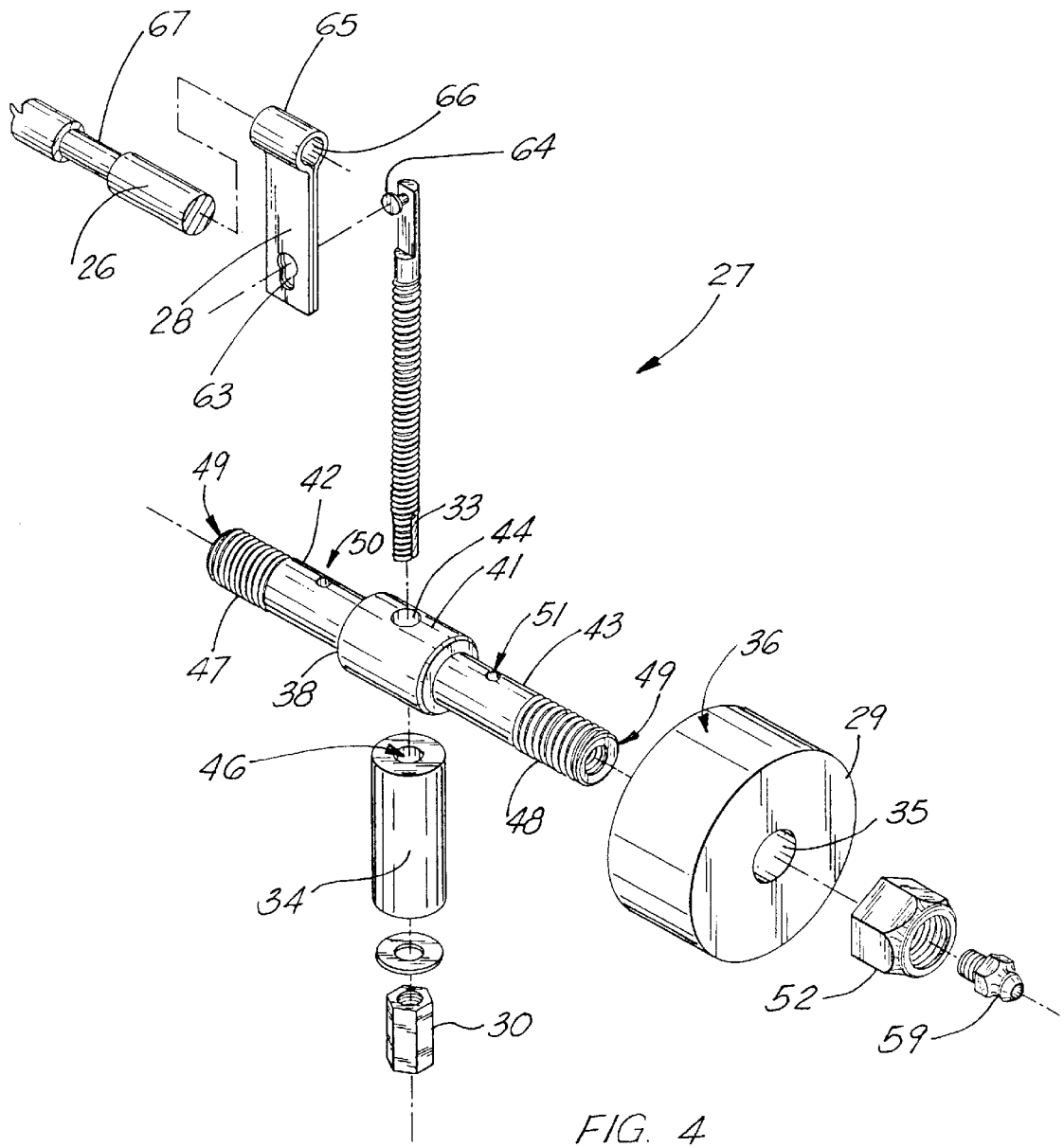
FIG. 4 is a partial exploded view of the preferred embodiment of the apparatus of the present invention illustrating a first embodiment of the hold down roller portion thereof.
Figure 5:
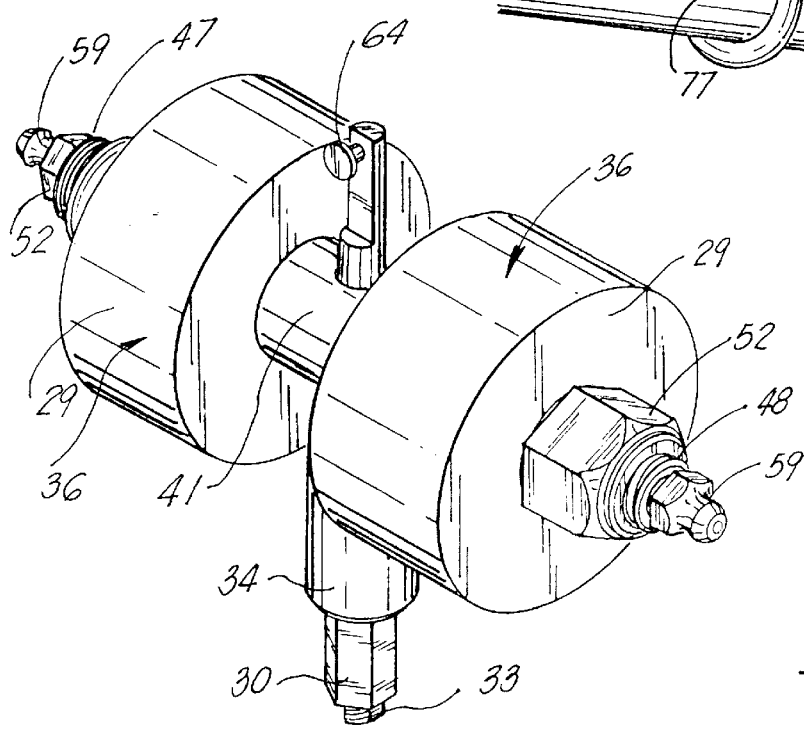
FIG. 5 is a partial perspective view of the hold down portion of FIG. 4 illustrating a first embodiment of the hold down roller portion thereof.

In FIGS. 3–5, there can be seen hold down roller assembly 27 in more detail. The hold down roller assembly 27 includes, at an upper portion, a hold down member 78, in this case a strap 28 that affixes to each smaller diameter insert roller 26 at reduced diameter section 67. Strap 28 has an enlarged cylindrically-shaped section 65 with a central bore 66 that fits reduced diameter section 67 of smaller diameter insert roller 26. Insert roller 26 contacts two adjacent larger diameter rollers 25. In FIG. 3, a smaller diameter insert roller 26 is held in position in close contact with rollers 25A and 25B. A second smaller diameter insert roller 26 is held in close contact with two adjacent rollers 25B, 25C.

Each hold down roller assembly 27 includes two spaced apart hold down rollers 29 as shown in FIGS. 3–5. Each roller 29 can by cylindrically shaped, having cylindrical outer surface 36. Each roller 29 provides a central opening 35, which may be lined by a bushing. The opening fits over barrel 38 at one of its smaller diameter end sections 42, 43. Barrel 38 has an enlarged diameter central section 41. Enlarged diameter central section 41 has a vertical opening 44 therethrough as shown in FIG. 4 for receiving externally threaded shaft 33. The threaded shaft 33 is threaded along the majority of its length, but provides an unthreaded upper end portion that carries hanger 64.

Barrel 38, which acts as an axle, receives two rollers 29, each being held in position by nut 52 and lubricant fitting 59. A nut 52 communicates with and engages each threaded section 47, 48 upon assembly as shown in FIGS. 4 and 5. Each end of the barrel 38 is hollow, providing axial longitudinal bores 49 that can receive a suitable lubricant. The lubricant enters bores 49 via fittings 59 and is transmitted to ports 50, 51 for communication with rollers 29 at opening 35. Hanger 64 registers in opening 63 of strap 28. Hanger 64 disconnects from opening 63 by loosening nut 30 for disassembly.

Shaft 33 receives polymeric sleeve 34, which is made of a resilient material, such as urethane, and acts as a compression element with an adjustable length. A coil spring could substitute as an alternative compression element in the hold down roller assembly. The sleeve 34 has a central passageway 46 that enables it to receive the shaft 33. Nut 30 is used to shorten by compression the polymeric sleeve through washer 60 against barrel 38 so as to apply tension to shaft 33 and strap 28 and thus to smaller diameter insert roller 26, forcing it into contact with rollers 25. Because the hold down roller assembly is not connected directly to the frame, the hold down rollers maintain the hold down member in proper position regardless of misalignment of the frame.

Figure 10:
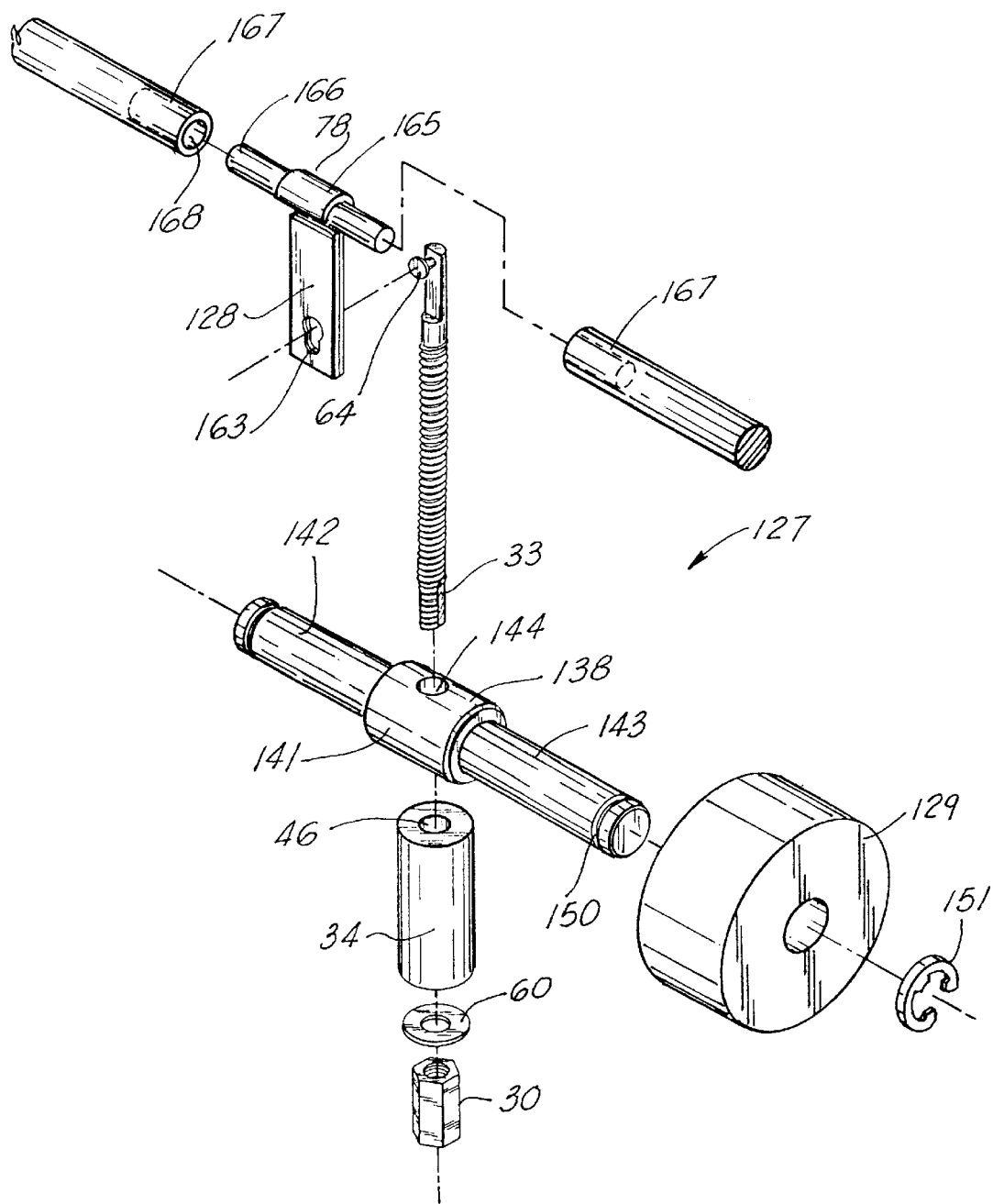
FIG. 10 is a partial exploded view of the preferred embodiment of the apparatus of the present invention illustrating a second version of the hold down roller portion thereof.

Another version of the hold down roller assembly is designated generally by the numeral 127, as shown in FIG. 10. In this version, no lubrication is required. A solid-core barrel 138 has a central larger diameter portion 141 flanked by two smaller diameter portions 142, 143, which act as axles for two rollers 129, preferably made of durable plastic material, such as UHMW (ultra high molecular weight) polymer. A circumferential groove 150 in the smaller diameter portion admits a clip 151 to retain each roller 129 on the barrel 138. The low-friction characteristics of the hold down roller 129 make lubrication unnecessary.

Vertical opening 144 formed in the barrel 138 receives a shaft 33 threaded at one end. A hanger 64 at the other end of the shaft 33 registers in an opening 163 in a hold down member 78. The hold down member includes a thin strap portion 128 forming a hook 165 encircling a pintle 166. The hook 165 is rigidly attached to the pintle 166. The two ends of the pintle 166 are journaled in axial openings 168 formed in ends of insert roller sections 167. Bushings in the openings provide wear resistance between the pintle 166 and the rotatable insert roller sections 167. In all other respects, the hold down roller assembly of FIG. 10 acts as that of FIG. 4.

It should be clear that the hold down roller assemblies of FIGS. 4 and 10 could each be used with either the one-piece insert rollers 26 of FIG. 4 or the sectional insert rollers 126 of FIG. 10.

Figure 9:
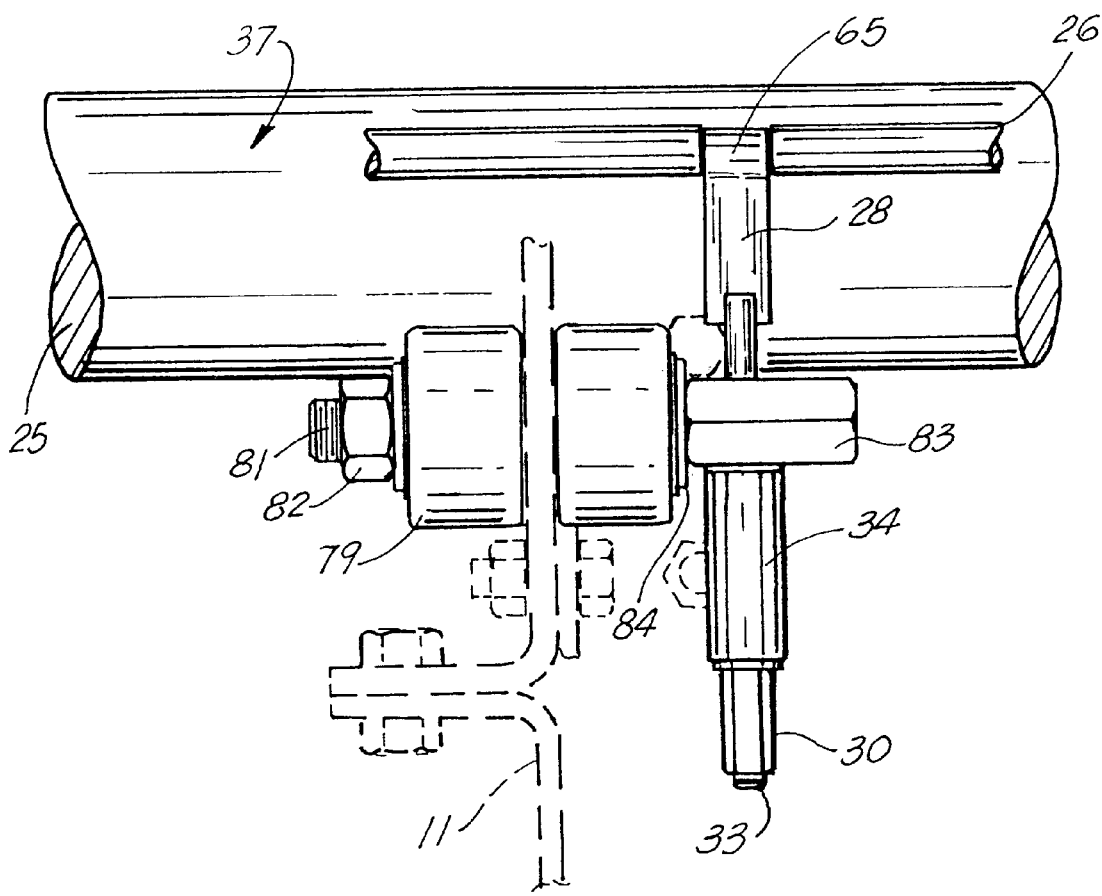
FIG. 9 is a fragmentary side view of the preferred embodiment of the apparatus of the present invention illustrating the hold down and roller support idler roller portions thereof.

At the roller support idler rollers 79, a non-free-floating hold down assembly holds down the insert roller. As best shown in FIG. 9, the hexagonal end 83 of the rod 81 has a vertical hole through it to accommodate the threaded vertical shaft 33. The adjustment nut 30 compresses the resilient polymeric sleeve 34 to vary the tension on the insert roller 26. Because the hexagonal end 83 is attached firmly to the frame 11, this hold down assembly is not free-floating.

Figure 6:
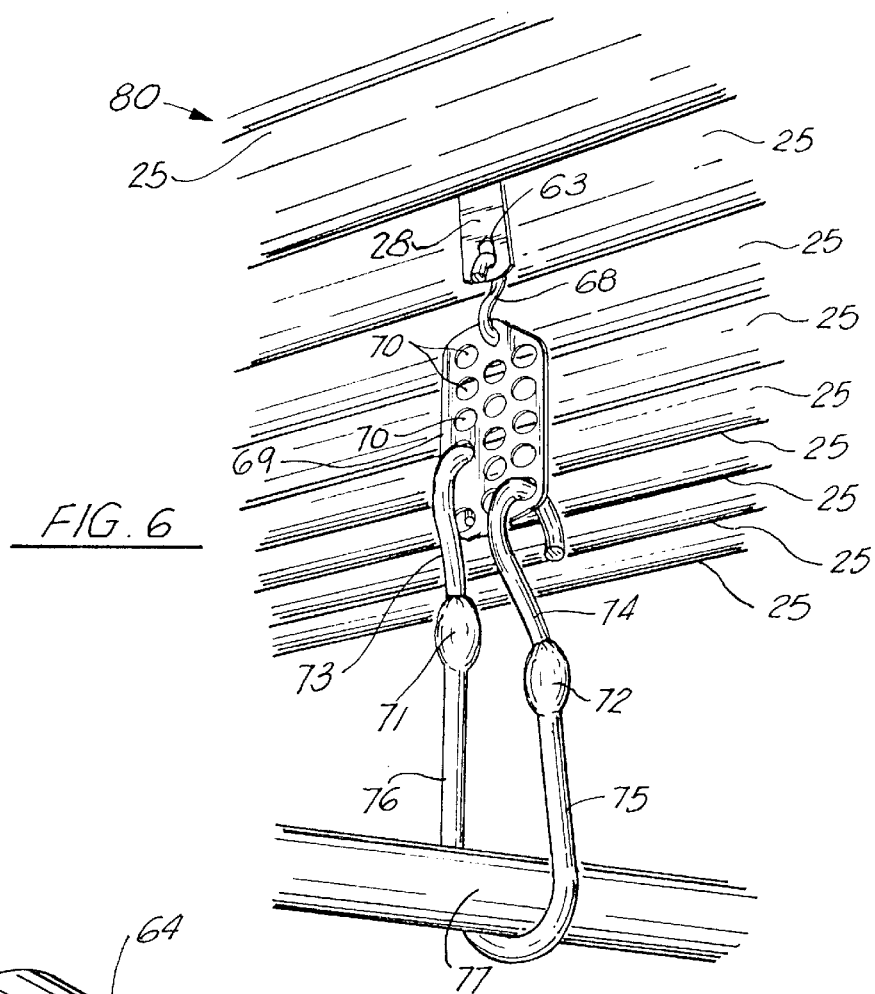
FIG. 6 is a partial perspective view showing an alternate construction of the hold down portion of the apparatus of the present invention.

In FIG. 6, another embodiment of the hold down apparatus is shown, designated generally by the numeral 80. As with the hold down assembly 27 of FIGS. 3–5 and 10, the hold down assembly 80 of FIG. 6 likewise employs a hold down member 78 that retains a smaller diameter insert roller 26 in the manner of FIG. 4 for one-piece insert rollers or in the manner of FIG. 10 for sectional insert rollers.

In FIG. 6, a different arrangement is shown for applying tension to hold down member 78. In FIG. 6, the hold down assembly 80 includes hold down member 78 that provides a lower opening 63 that attaches to an S-hook 68. S-hook 68 hangs plate 69 therefrom. The plate 69 has an array of position defining openings 70 spaced over the plate 69, each opening positioned at a different distance from S-hook 68. This enables the hook end portions 73, 74 of tension member 76 to engage the openings 70 of plate 69 at selected positions. The combination of tensile elastic cord 75, end portions 71, 72 and hooks 73, 73 define tension member 76. The hooks 73, 74 are provided at end portions 70, 71 of elastic cord 75. During use, the tension member 76 is wrapped around a transverse support 77 portion of frame 11. The hooks 74, 75 at respective ends 73, 74 are attached to plate 69 at two of the selected opening 70 in plate 69. In order to apply more tension, hooks 73, 74 are moved to openings 70 that are closer to S-hook 68. In order to apply less tension, hooks 73, 74 are moved to the openings 70 that are positioned farther away from S-hook 68, stretching length adjustable tensile chord 75. In such a manner, uneven tensioning of the hold downs due to stress bending of the transverse support can be compensated for.

The following table lists the parts numbers and parts descriptions as used herein and in the drawings attached hereto.

PARTS LIST

| Part Number | Description |
| --- | --- |
| 10 | shrimp peeler apparatus |
| 11 | frame |
| 12 | feet |
| 13 | leg |
| 14 | leg |
| 15 | leg |
| 16 | leg |
| 17 | horizontal beam |
| 18 | horizontal beam |
| 19 | horizontal beam |
| 20 | horizontal beam |
| 21 | inclined beam section |
| 22 | inclined beam section |
| 23 | transverse plate |
| 24 | transverse plate |
| 25 | larger diameter roller |
| 25A | larger diameter roller |
| 25B | larger diameter roller |
| 25C | larger diameter roller |
| 26 | smaller diameter insert roller |
| 27 | hold down roller assembly |
| 28 | strap |
| 29 | hold down roller |
| 30 | adjustment nut |
| 31 | smaller diameter section |
| 32 | larger diameter section |
| 33 | threaded shaft |
| 34 | polymeric sleeve |
| 35 | central opening |
| 36 | cylindrical outer surface |
| 37 | polymeric outer surface |
| 38 | barrel |
| 39 | gear box |
| 40 | belt |
| 41 | enlarged diameter section |
| 42 | smaller diameter section |
| 43 | smaller diameter section |
| 44 | vertical opening |
| 45 | dividers |
| 45A | channels |
| 46 | passageway |
| 47 | threaded end portion |
| 48 | threaded end portion |
| 49 | bore |
| 50 | port |
| 51 | port |
| 52 | nut |
| 57 | input end |
| 58 | output end |
| 59 | lubricant |
| 60 | washer |
| 61 | motor drive |
| 62 | drive train |
| 63 | opening |
| 64 | hanger |
| 65 | cylindrical portion |
| 66 | bore |
| 67 | reduced diameter section |
| 68 | S-hook |
| 69 | plate |
| 70 | opening |
| 71 | end |
| 72 | end |

-continued

PARTS LIST

| Part Number | Description |
|---|---|
| 73 | hook |
| 74 | hook |
| 75 | elastic cord |
| 76 | tension member |
| 77 | transverse support |
| 78 | hold down member |
| 79 | roller support idler roller |
| 80 | hold down assembly |
| 81 | threaded rod |
| 82 | nut |
| 83 | hexagonal end |
| 84 | washer |
| 127 | hold down assembly |
| 128 | strap portion |
| 129 | hold down roller |
| 138 | barrel |
| 141 | larger diameter portion |
| 142 | smaller diameter portion |
| 143 | smaller diameter portion |
| 144 | vertical opening |
| 150 | groove |
| 151 | clip |
| 163 | opening |
| 165 | hook |
| 166 | pintle |
| 167 | insert roller sections |
| 168 | axial openings |

The foregoing embodiments are presented by way of example only; the scope of the present invention is to be limited only by the following claims.

We claim:

1. A shrimp peeling apparatus comprising:

a) a support frame;

b) a plurality of larger diameter rollers supported by the frame each having an upper surface;

c) a plurality of smaller diameter insert rollers, each smaller diameter insert roller supported by a pair of larger diameter rollers at a position below the respective upper surfaces of said pair of larger diameter rollers;

d) a shrimp holding channel being defined by each smaller diameter roller and the supporting pair of larger diameter rollers;

e) wherein the diameter of each of the plurality of larger diameter rollers is much greater than the diameter of each of the plurality of smaller diameter insert rollers;

f) a hold down assembly for holding each of the smaller diameter insert rollers in close engagement with said pair of the larger diameter rollers;

g) the hold down assembly including a hold down member that retains the smaller diameter insert roller and a tensile member for applying tension to the hold down members; an h) an adjustment for varying the load transfer between a selected smaller diameter insert roller and the adjacent larger diameter rollers by varying the tensile load carried by the tensile member.

2. A shrimp peeling apparatus comprising:

a) a support frame;

b) a plurality of larger diameter rollers supported by the frame;

c) a plurality of smaller diameter insert rollers, each smaller diameter insert roller supported by a pair of larger diameter rollers;

d) wherein the diameter of each of the plurality of larger diameter rollers is much greater than the diameter of each of the plurality of smaller diameter insert rollers;

e) a hold down assembly for holding each of the smaller diameter insert rollers in close engagement with said pair of the larger diameter rollers;

f) the hold down assembly including a hold down member that retains the smaller diameter, insert roller and a tension member for applying tension to the hold down member; and g) an adjustment for varying the load transfer between a selected smaller diameter insert roller and the adjacent larger diameter rollers by varying the tensile load carried by the tensile member h) wherein the hold down assembly includes a plate connected to the hold down member and having adjustment positions spaced over the plate, wherein the tensile member spans between the frame and the plate at a selected one of the adjustment positions.

3. The shrimp peeling apparatus of claim 2 wherein the tensile member includes a pair of end portions, at least one end portion having means thereon for forming an attachment to the plate at a selected adjustment position.

4. The shrimp peeling apparatus of claim 2 wherein the tensile member is at least partially elastic, extending between the frame and the plate at one of the adjustment positions by stretching to apply tension.

5. The shrimp peeling apparatus of claim 2 wherein the adjustment positions comprise openings in the plate.

6. The shrimp peeling apparatus of claim 5 wherein the openings are arranged in multiple rows.

7. The shrimp peeling apparatus of claim 4 wherein the tensile member includes a detachable connection between the plate and the elastic portion of the tensile member.

8. The shrimp peeling apparatus of claim 2 wherein the tensile member attaches to the plate at two adjustment positions.

9. A shrimp peeling apparatus comprising:

a) a support frame;

b) a plurality of larger diameter rollers supported by the frame, each having a central longitudinal axis, the axes of the larger diameter rollers lying in a common plate;

c) a plurality of smaller diameter insert rollers, each being supported by a pair of the larger diameter rollers;

d) wherein the diameter of each of the plurality of larger diameter rollers is much greater than the diameter of each of the plurality of smaller diameter insert rollers;

e) a hold down assembly for holding each of the smaller diameter insert rollers in close engagement with a pair of the larger diameter rollers; and f) the hold down assembly including an elastic tensile member and an adjustment for varying the load transfer between a selected smaller diameter insert roller and the said pair of larger diameter rollers.

10. The shrimp peeling appartus of claim 9 wherein the elastic tensile member extends between the frame and the smaller diameter insert roller.

11. The shrimp peeling apparatus of claim 10 wherein the hold down assembly includes an adjustment plate for varying the distance between the frame and the smaller diameter insert roller that is spanned by the elastic tensile member.

12. A shrimp peeling apparatus comprising:

a) a support frame;

b) a plurality of larger diameter rollers supported by the frame;

c) a plurality of smaller diameter insert rollers, each smaller diameter insert roller supported by a pair of larger diameter rollers;

d) wherein the diameter of each of the plurality of larger diameter rollers is much greater than the diameter of each of the plurality of smaller diameter insert rollers;

e) a hold down assembly for holding each of the smaller diameter insert rollers in close engagement with the pair of larger diameter rollers;

f) the hold down assembly including a hold down member that retains the smaller diameter insert roller and a tension member for applying tension to the hold down member;

g) the tension member including an adjustable-length portion made of an elastic material; and h) an adjustment for varying the length of the adjustable-length portion to vary the tensile load carried by the tension member to vary the load transfer between a selected smaller diameter insert roller and the adjacent larger diameter rollers.

13. The shrimp peeling apparatus of claim 12 wherein the hold down assembly includes at least one free-floating roller hold down that is positioned on the underside of said larger diameter rollers, opposite said smaller diameter insert rollers.

14. The shrimp peeling apparatus of claim 12 wherein the hold down assembly includes a pair of free-floating rollers.

15. The shrimp peeling apparatus of claim 12 wherein the tension member includes a transversely extending barrel and a vertical shaft that extends between the hold down member and the transversely extending barrel.

16. The shrimp peeling apparatus of claim 15 wherein the adjustment is applied by an adjustment member for varying the tension transferred to the vertical shaft.

17. The shrimp peeling apparatus of claim 16 wherein the adjustable portion of the tension member is a resilient sleeve that is mounted on the vertical shaft in between the transversely extending barrel and the adjustment member.

18. The shrimp peeling apparatus of claim 17 wherein the vertical shaft is threaded and the adjustment member is a nut threadably attached to the vertical shaft.

19. The shrimp peeling apparatus of claim 16 wherein the adjustment member increases the tension in the tension member by decreasing the length of the adjustable portion of the tension member through compression.

20. The shrimp peeling apparatus of claim 12, wherein the adjustable portion of the tension member is an elastic cord extending between the frame and the hold down member.

21. The shrimp peeling apparatus of claim 12 wherein the hold down assembly includes a plate connected to the hold down member and having adjustment positions spaced over the plate, wherein the adjustable portion of the tension member spans between the frame and the plate at a selected one of the adjustment positions.

22. A shrimp peeling apparatus comprising:

a) a support frame;

b) a plurality of larger diameter rollers supported by the frame;

c) a plurality of smaller diameter insert rollers, each smaller diameter insert roller supported by a pair of larger diameter rollers;

d) wherein the diameter of each of the plurality of larger diameter rollers is much greater than the diameter of each of the plurality of smaller diameter insert rollers;

e) a hold down assembly for holding each of the smaller diameter insert rollers in close engagement with the pair of larger diameter rollers;

f) the hold down assembly including a hold down member that retains the smaller diameter insert roller and a tension member for applying tension to the hold down member; and g) the hold down assembly including at least one free-floating roller hold down that is positioned on the underside of the larger diameter rollers, opposite the smaller diameter insert rollers.

23. The shrimp peeling apparatus of claim 22 wherein the hold down assembly includes a pair of free-floating rollers.

24. The shrimp peeling apparatus of claim 22 wherein the tension member includes a transversely extending barrel and a vertical shaft that extends between the hold down member and the transversely extending barrel.

25. The shrimp peeling apparatus of claim 22 wherein the hold down assembly includes an adjustment for varying the load transfer between a selected smaller diameter insert roller and the adjacent larger diameter rollers by varying the tensile load carried by the tension member.

26. The shrimp peeling apparatus of claim 25 wherein the adjustment is applied by an adjustment member for varying the tension transferred to the vertical shaft.

27. The shrimp peeling apparatus of claim 26 further comprising a resilient sleeve that is mounted on the vertical shaft in between the transversely extending barrel and the adjustment member.

28. The shrimp peeling apparatus of claim 27 wherein the vertical shaft is threaded and the adjustment member is a nut threadably attached to the vertical shaft.

29. The shrimp peeling apparatus of claim 27 wherein the adjustment member increases the tension in the tension member by compressing the resilient sleeve against the transversely extending barrel.

30. The shrimp peeling apparatus of claim 23 wherein each of the pair of hold down rollers engages the undersides of a pair of adjacent larger diameter rollers.

31. The shrimp peeling apparatus of claim 24 wherein the holddown assembly includes a pair of hold down rollers, each hold down roller rotatably mounted on the transversely extending barrel on opposite sides of the vertical shaft.

32. The shrimp peeling apparatus of claim 31 wherein the transversely extending barrel includes at least one axial bore in fluid communication with openings on the surface of the barrel to provide lubricant to the hold down rollers.

33. The shrimp peeling apparatus of claim 31 wherein the pair of hold down rollers is made of a durable plastic material and the transverse barrel has a solid core.

34. The shrimp peeling apparatus of claim 11 wherein the plate has multiple adjustment positions spaced over the plate.

35. The shrimp peeling apparatus of claim 34 wherein the adjustment positions comprise openings in the plate.

36. The shrimp peeling apparatus of claim 35 wherein the openings are arranged in multiple rows.

37. The shrimp peeling apparatus of claim 34 wherein the tensile member includes a detachable connection between the plate and the elastic portion of the tensile member.

38. The shrimp peeling apparatus of claim 34 wherein the tensile member attaches to the plate at two adjustment positions.

39. A shrimp peeling apparatus comprising:

a) a support frame;

b) a plurality of larger diameter rollers supported by the frame each having an upper surface;

c) a plurality of smaller diameter insert rollers, each smaller diameter insert roller supported by a pair of larger diameter rollers at a position below the respective upper surfaces of said pair of larger diameter rollers;

d) a shrimp holding channel being defined by each smaller diameter roller and the supporting pair of larger diameter rollers, wherein the channel has opposed sides and a bottom, a larger diameter roller defining each respective channel side and the smaller diameter roller defining the channel bottom;

e) peeling nips at the bottom of the channel on opposing sides of the smaller diameter roller;

f) wherein the diameter of each of the plurality of larger diameter rollers is much greater than the diameter of each of the plurality of smaller diameter insert rollers;

g) a hold down assembly for holding each of the smaller diameter insert rollers in close engagement with said pair of the larger diameter rollers.

40. The shrimp peeling apparatus of claim 39 wherein the hold down assembly includes a hold down member that retains the smaller diameter roller and a tensile member for applying tension to the hold down member.

41. The shrimp peeling apparatus of claim 39 wherein the peeling nips are at about the same elevational position.

42. The shrimp peeling apparatus of claim 39 wherein the bottom of the channel has a wrath that is defined by the diameter of the smaller diameter roller.

43. The shrimp peeling apparatus of claim 39 wherein the tensile member includes a detachable connection between the plate and the elastic portion of the tensile member.

44. The shrimp peeling apparatus of claim 39 wherein the tensile member attaches to the plate at two adjustment positions.

45. The shrimp peeling apparatus of claim 39 wherein the larger diameter rollers are at the same elevational position.

* * * * *